United States Patent
Ono

(10) Patent No.: US 7,620,292 B2
(45) Date of Patent: Nov. 17, 2009

(54) REPRODUCING APPARATUS

(75) Inventor: Yasumasa Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 10/863,604

(22) Filed: Jun. 8, 2004

(65) Prior Publication Data

US 2004/0264921 A1 Dec. 30, 2004

(30) Foreign Application Priority Data

Jun. 24, 2003 (JP) ............................. 2003-179950

(51) Int. Cl.
*G11B 27/00* (2006.01)
*H04N 5/93* (2006.01)
*H04N 5/91* (2006.01)

(52) U.S. Cl. ............................. 386/52; 386/53; 386/83

(58) Field of Classification Search .................. 386/52, 386/53, 83
See application file for complete search history.

(56) References Cited

U.S. PATENT DOCUMENTS

| 5,008,755 | A | * | 4/1991 | Brain | 348/578 |
| 5,278,662 | A | * | 1/1994 | Womach et al. | 386/54 |
| 5,825,965 | A | * | 10/1998 | Kizu | 386/52 |
| 6,141,484 | A | * | 10/2000 | Nagasawa et al. | 386/52 |
| 6,198,873 | B1 | * | 3/2001 | Takano | 386/55 |
| 6,236,802 | B1 | * | 5/2001 | Yamamoto | 386/52 |
| 6,807,362 | B1 | * | 10/2004 | Girgensohn et al. | 386/52 |
| 7,020,381 | B1 | * | 3/2006 | Kato et al. | 386/53 |
| 7,055,100 | B2 | * | 5/2006 | Moriwake et al. | 715/723 |
| 7,319,493 | B2 | * | 1/2008 | Hata et al. | 386/53 |
| 2002/0097449 | A1 | * | 7/2002 | Ishii | 358/452 |
| 2003/0012550 | A1 | * | 1/2003 | Sakai et al. | 386/52 |
| 2003/0016947 | A1 | * | 1/2003 | Ishii | 386/52 |
| 2004/0146275 | A1 | * | 7/2004 | Takata et al. | 386/52 |

FOREIGN PATENT DOCUMENTS

JP 08-289200 11/1996

* cited by examiner

*Primary Examiner*—Thai Tran
*Assistant Examiner*—Hung Q Dang
(74) *Attorney, Agent, or Firm*—Canon U.S.A. Inc., I.P. Division

(57) ABSTRACT

A reproducing apparatus that is capable of applying a special effect process to a moving picture signal reproduced from a recording medium is disclosed. The reproducing apparatus is configured to set an execution time of the special effect process shorter than or equal to a prescribed time required for the special effect process.

12 Claims, 3 Drawing Sheets

REPRODUCING APPARATUS

BACKGROUND OF THE INVENTION

1. Field of the Invention

The present invention relates to reproducing apparatuses, and more particularly to an apparatus capable of reproducing moving pictures and applying special effects to the moving pictures reproduced.

2. Description of Related Art

Heretofore, some household video cameras applied special effects to moving pictures and sounds reproduced from a magnetic tape. These special effects include a fade-in effect in which the moving pictures and sounds reproduced are made gradually visible and audible, and a fade-out effect in which the moving pictures and sounds reproduced are made gradually fainter until they disappear, as disclosed, for example, in Japanese Laid-Open Patent Application No. Hei 8-289200.

In such a conventional type of video camera, a magnetic tape is used as a recording medium on which moving pictures and sounds are recorded. Therefore, it is hard for the user to accurately grasp a reproduction time of the moving pictures for a given scene. In recent years, apparatuses that are capable of recording a still image signal or a moving picture signal in a memory card have been put on the market. In cases where a moving picture signal has been recorded in a memory card, it is possible for the user to accurately grasp a reproduction time of the moving picture signal.

In such systems, there is a prescribed time that is required to adequately perform the fade process. Even though the user can grasp the reproduction time, the user does not know the prescribed time required to perform the fade process. Even if the user did know the prescribed time to adequately perform the fade process, the user would have to obtain the reproduction time and then the user would have to make a decision as to whether or not the reproduction time was sufficiently long to properly perform the fade process. Since this is not practical, the user typically will perform the reproduction with the desired fade process even though it is possible that the fade process will not be adequately performed because the length of the reproduction time is not sufficient to perform the desired fade process.

SUMMARY OF THE INVENTION

The present invention solves the above-mentioned problem. A special effect process, such as a fade process, can be appropriately performed even if a length of reproduction time for a scene of a reproduced moving picture signal is less than a prescribed time required for the special effect process.

According to an aspect of the present invention, a reproducing apparatus is provided. The reproducing apparatus comprises reproducing means for reproducing a moving picture signal recorded in a recording medium, detecting means for detecting a reproduction time of the moving picture signal, special effect means for applying a special effect process to the moving picture signal reproduced from the recording medium, and control means for setting a special effect execution time length to a time length not longer than a prescribed time length required for the special effect process.

In accordance with another aspect of the present invention, the control means sets the special effect execution time length to the prescribed time length if the reproduction time length of the moving picture signal is longer than the prescribed time length plus a predetermined time length.

In accordance with another aspect of the present invention, the control means sets the special effect execution time length to a time obtained by subtracting the predetermined time length from the reproduction time length of the moving picture signal if the reproduction time length of the moving picture signal is longer than the prescribed time length and not longer than the prescribed time length plus the predetermined time length.

In accordance with another aspect of the present invention, the control means inhibits the special effect process from being applied to the reproduced moving picture signal if the reproduction time length of the moving picture signal is not longer than the prescribed time length.

In accordance with another aspect of the present invention, the reproducing means retrieves, from the recording medium, reproduction-time information indicating the reproduction time length of the moving picture signal, and the detecting means detects the reproduction time length of the moving picture signal on the basis of the reproduction-time information retrieved by the reproducing means.

In accordance with yet another aspect of the present invention, the special effect process to be applied by the special effect means includes a plurality of types of special effect processes. The prescribed time length for each of the special effect processes is determined based on the respective type of special effect process.

In accordance with still another aspect of the present invention, the special effect process includes a fade process.

In accordance with still another aspect of the present invention, the special effect means outputs the moving picture signal with the applied special effect process, and a display means displays pictures represented by the moving picture signal output by the special effect means.

In accordance with still another aspect of the present invention, the special effect means executes the special effect process continuously during the special effect execution time length set by the control means.

According to another aspect of the present invention, an imaging apparatus comprises: imaging means; recording means for recording, in a recording medium, a moving picture signal provided by the imaging means; reproducing means for reproducing the moving picture signal from the recording medium; detecting means for detecting a reproduction time length of the moving picture signal; special effect means for applying a special effect process to the moving picture signal reproduced from the recording medium; and control means for determining a special effect execution time length based on the reproduction time detected by the detecting means.

According to another aspect of the present invention, a method for applying a special effect process to a moving picture signal comprises detecting a reproduction time length of the moving picture signal and determining if the reproduction time length of the moving picture signal is longer than a prescribed time length required for the special effect process. If the reproduction time length of the moving picture signal is not longer than the prescribed time length required for the special effect process, a special effect execution time length is set to a time length not greater than the prescribed time length. The moving picture signal is reproduced including the special effect process, with the special effect process being performed for the special effect execution time length.

The above and further features and advantages of the present invention will become apparent to those skilled in the art upon reading of the following detailed description of an exemplary embodiment thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE INVENTION

Embodiments of the present invention are described in detail below with reference to the drawings.

Figure 1:
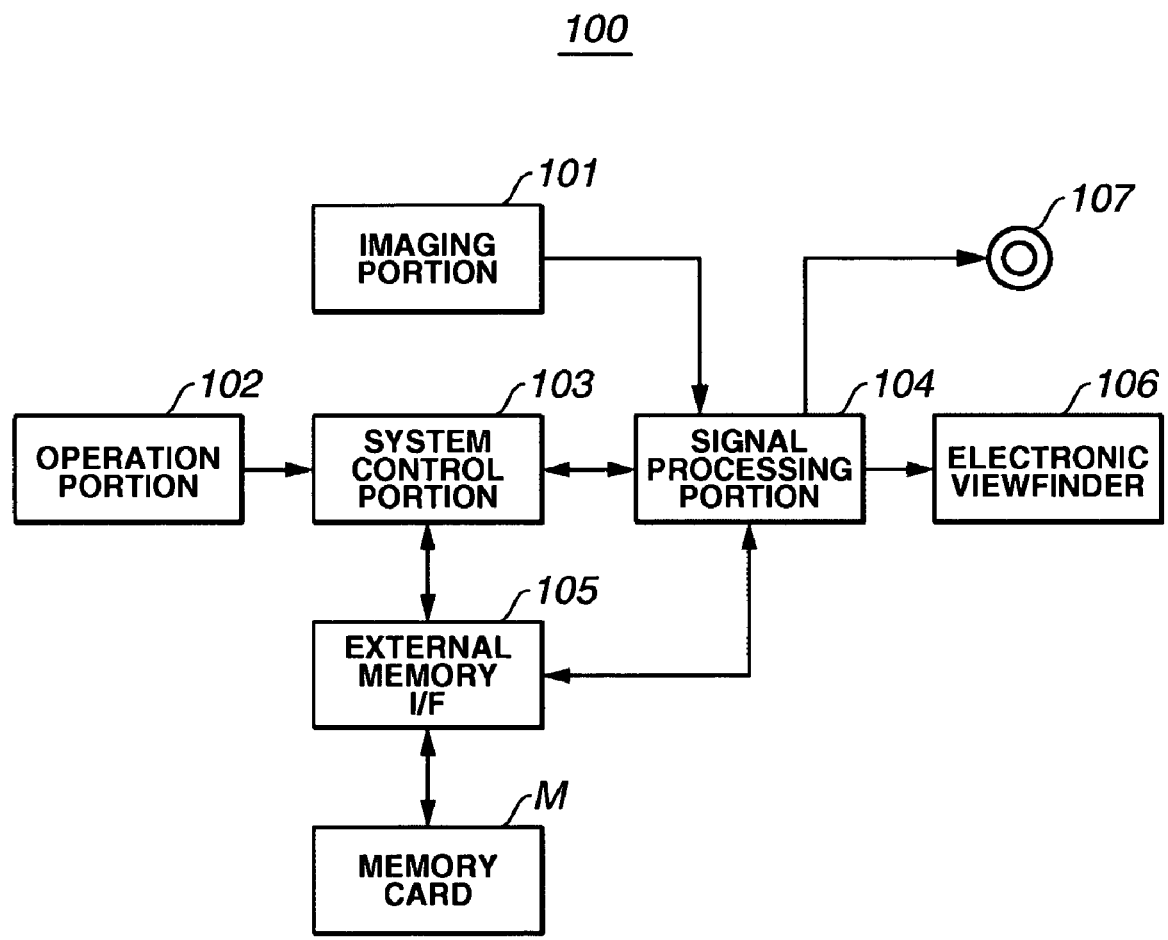
FIG. 1 is a block diagram illustrating principal elements of a video camera.

FIG. 1 is a block diagram illustrating the principal elements of a video camera 100. The video camera 100 includes an imaging portion 101, an operation portion 102, a system control portion 103, a signal processing portion 104, an external memory interface (I/F) 105, an electronic viewfinder 106, and an output terminal 107.

The operation portion 102 has a variety of operation switches. The system control portion 103 controls each portion of the video camera 100. The signal processing portion 104 processes a moving picture signal in accordance with instructions for recording or reproduction. The external memory interface (I/F) 105 records and reproduces moving picture data in or from a memory card M. The electronic viewfinder 106 displays moving pictures represented by a moving picture signal supplied from the signal processing portion 104. The moving picture signal is externally output from the video camera 100 through the output terminal 107.

An ordinary recording operation of the video camera 100 is described next.

The imaging portion 101 has an optical element, such as a lens, an image pickup element, such as a CCD (charge coupled device), and other known elements, and is configured to output a moving picture signal representative of moving pictures of a subject taken by the video camera 100. The moving picture signal output from the imaging portion 101 is supplied to the electronic viewfinder 106 via the signal processing portion 104, so that the moving pictures taken by the imaging portion 101 are displayed on the electronic viewfinder 106. With the moving pictures displayed on the electronic viewfinder 106, when the user manipulates the operation portion 102 to give the video camera 100 instructions to start a recording operation, the system control portion 103 instructs the signal processing portion 104 and the external memory I/F 105 to start the recording operation.

The signal processing portion 104, in response to the instructions for starting the recording operation, applies a known encoding process, such as MPEG (Moving Picture Experts Group), to the moving picture signal output from the imaging portion 101, and outputs the encoded moving picture data to the external memory I/F 105. The external memory I/F 105 records the encoded moving picture data output from the signal processing portion 104 in predetermined addresses of the memory card M. With the recording operation continued in such a way, when the user manipulates the operation portion 102 to give the video camera 100 instructions to stop the recording operation, the system control portion 103 instructs the signal processing portion 104 and the external memory I/F 105 to stop the recording operation.

The signal processing portion 104, in response to the instructions for stopping the recording operation, stops applying the encoding process to the moving picture signal and stops outputting the moving picture data to the external memory I/F 105. The external memory I/F 105 stops recording the moving picture data in the memory card M. In the embodiment, moving picture data of a continuous scene recorded in the memory card M during a period from the point of time of the instructions for starting recording until the point of time of the instructions for stopping recording is stored as a single file. Prior to the recording operation, the system control portion 103 measures a reproduction time of one scene and causes the measured reproduction time to be stored in a predetermined area, such as a footer area, of the file of moving picture data.

A process that is performed at the time of reproduction of moving picture data recorded in the memory card M is described next.

When the user manipulates the operation portion 102 to give the video camera 100 instructions to start reproduction, the system control portion 103 instructs the external memory I/F 105 to reproduce a moving picture file as designated from the memory card M. The external memory I/F 105 reproduces data of the designated moving picture file from the memory card M and sends the reproduced moving picture data to the signal processing portion 104. The signal processing portion 104 decodes the reproduced moving picture data output from the external memory I/F 105 and outputs the decoded moving picture signal to the electronic viewfinder 106 and the output terminal 107. As a result, reproduced moving pictures are displayed on the electronic viewfinder 106.

In the embodiment, a variety of special effect processes, such as a fade process, can be applied to reproduced moving pictures by means of the signal processing portion 104.

A special effect process to be applied to moving pictures during reproduction is described next. The exemplary special effect process described next is a fade-in process.

When the user manipulates the operation portion 102 to give the video camera 100 instructions to perform a fade-in process as well as to reproduce moving pictures from the memory card M, the system control portion 103 instructs the external memory I/F 105 to read out information on a reproduction time of moving picture data from a moving picture file as designated. The system control portion 103 determines, as described below, an execution time of the fade-in process to be applied to reproduced moving pictures, on the basis of information on the reproduction time read out from the memory card M.

More specifically, if a reproduction time T of moving picture data is equal to or shorter than a prescribed time A that is determined beforehand as a minimum operation time required for a fade-in process, the system control portion 103 inhibits the fade-in process from being applied to the moving picture data.

On the other hand, if the reproduction time T of moving picture data is longer than the prescribed time A of the fade-in process, the system control portion 103 allows the fade-in process to be performed. In this instance, the execution time of the fade-in process is set as described below depending on the reproduction time T of moving picture data.

If the reproduction time T of moving picture data is longer than the prescribed time A of the fade-in process and equal to or shorter than the prescribed time A of the fade-in process plus a predetermined time α, the system control portion 103 sets the execution time of the fade-in process to the reproduction time T of moving picture data minus the predetermined time α.

On the other hand, if the reproduction time T of moving picture data is longer than the prescribed time A of the fade-in process plus the predetermined time α, the system control portion 103 sets the execution time of the fade-in process to the prescribed time A of the fade-in process.

Below are some examples that assume that the prescribed time A of the fade-in process is four seconds and that the predetermined time α is four seconds:

(1) If the reproduction time T of moving picture data is shorter than four seconds, the system control portion 103 inhibits the fade-in process.

(2) If the reproduction time T of moving picture data is longer than four seconds and equal to or shorter than eight seconds, for example, seven seconds, the system control portion 103 sets the execution time of the fade-in process to seven seconds (the reproduction time T) minus four seconds (the predetermined time α), i.e., three seconds.

(3) If the reproduction time T of moving picture data is longer than eight seconds, the system control portion 103 sets the execution time of the fade-in process to four seconds (the prescribed time A).

After setting the execution time of the fade-in process in the above-described manner, the system control portion 103 instructs the external memory I/F 105 to reproduce moving picture data. The system control portion 103 also instructs the signal processing portion 104 to start the fade-in process.

The external memory I/F 105 reproduces moving picture data from the memory card M and sends the reproduced moving picture data to the signal processing portion 104. The signal processing portion 104 decodes the reproduced moving picture data and applies, to the decoded moving picture data, such a fade-in process that reproduced moving pictures gradually appear from a predetermined color constant picture, for example, a white constant picture. The signal processing portion 104 then supplies the fade-in-processed moving picture data to the electronic viewfinder 106.

When the execution time of the fade-in process has elapsed after the start of reproduction, the system control portion 103 instructs the signal processing portion 104 to bring the fade-in process to an end, thereby finishing the fade-in process. It should be noted that the fade-in process is such a process that white picture data and reproduced moving picture data are combined while the ratio between them is gradually varied with the elapse of time, and the system control portion 103 changes the speed at which to vary the ratio between the white picture data and the reproduced moving picture data, according to the execution time of the fade-in process as set in the above-described way. Information indicative of the changed speed is sent to the signal processing portion 104.

Moreover, other special effect processes, for example, a fade-out process, can also be applied to reproduced moving pictures. Like the execution time of the fade-in process, an execution time of the fade-out process is decided depending on a reproduction time T of moving picture data.

When the user manipulates the operation portion 102 to give the video camera 100 instructions to perform a fade-out process as well as to reproduce moving pictures from the memory card M, the system control portion 103 instructs the external memory I/F 105 to read out information on a reproduction time T of moving picture data as designated. The system control portion 103 determines an execution time of the fade-out process to be applied to reproduced moving pictures, on the basis of information on the reproduction time T read out from the memory card M.

More specifically, if the reproduction time T of moving picture data is equal to or shorter than a prescribed time B that is beforehand determined as a minimum operation time required for a fade-out process, the system control portion 103 inhibits the fade-out process from being applied to the moving picture data.

On the other hand, if the reproduction time T of moving picture data is longer than the prescribed time B of the fade-out process, the system control portion 103 allows the fade-out process to be performed. In this instance, the execution time of the fade-out process is set as described below depending on the reproduction time T of moving picture data.

If the reproduction time T of moving picture data is longer than the prescribed time B of the fade-out process and equal to or shorter than the prescribed time B of the fade-out process plus a predetermined time β, the system control portion 103 sets the execution time of the fade-out process to the reproduction time T of moving picture data minus the predetermined time β.

On the other hand, if the reproduction time T of moving picture data is longer than the prescribed time B of the fade-out process plus the predetermined time β, the system control portion 103 sets the execution time of the fade-out process to the prescribed time B of the fade-out process.

After determining the execution time of the fade-out process in the above-described manner, the system control portion 103 instructs the external memory I/F 105 to reproduce moving picture data. The external memory I/F 105 reproduces moving picture data from the memory card M and sends the reproduced moving picture data to the signal processing portion 104. The signal processing portion 104 decodes the reproduced moving picture data and then supplies the decoded moving picture data to the electronic viewfinder 106.

Then, after a time obtained by subtracting the execution time of the fade-out process (determined as described above) from the reproduction time T of moving picture data has elapsed, the system control portion 103 instructs the signal processing portion 104 to start the fade-out process.

In response to instructions for starting the fade-out process, the signal processing portion 104 applies, to the reproduced moving picture data, such a fade-out process that reproduced moving pictures gradually disappear and a predetermined color constant picture, for example, a white constant picture, gradually appears. The signal processing portion 104 then supplies the fade-out-processed moving picture data to the electronic viewfinder 106.

When the execution time of the fade-out process has elapsed after the start of the fade-out process, the system control portion 103 instructs the signal processing portion 104 to bring the fade-out process to an end, thereby finishing the fade-out process and the reproducing operation.

Figure 2:
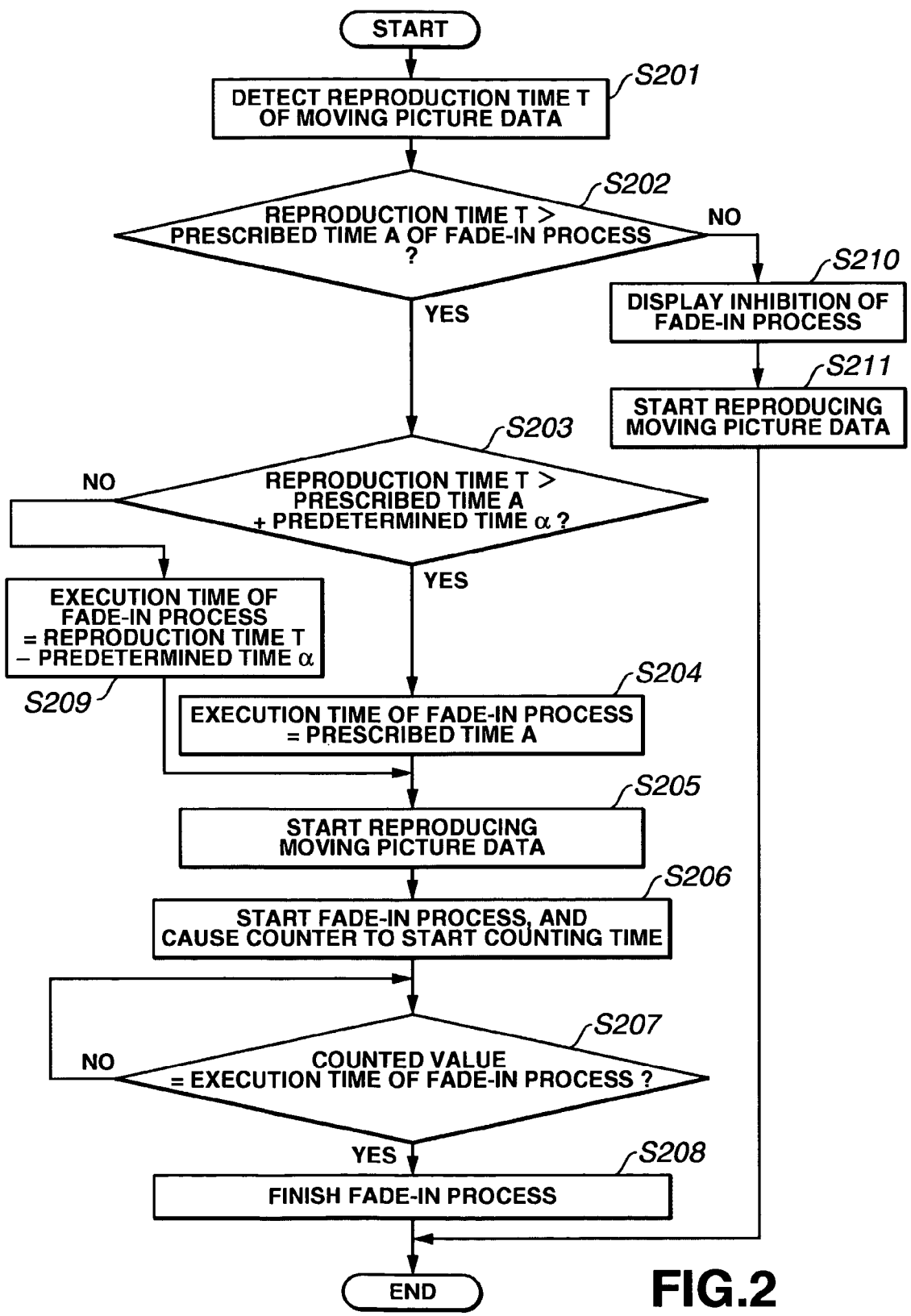
FIG. 2 is a flow chart illustrating a fade-in process performed during reproduction of moving picture data.

FIG. 2 is a flow chart illustrating the operation of the system control portion 103 in which a fade-in process (as described above) is performed during reproduction of moving picture data.

When instructions for performing a fade-in process as well as instructions for starting reproduction are given by the operation portion 102, the system control portion 103 detects a reproduction time T of moving picture data by causing the external memory I/F 105 to read out information on the reproduction time T from the memory card M (step S201). Then, the system control portion 103 determines whether the reproduction time T of moving picture data is longer than the prescribed time A of the fade-in process (step S202). If the reproduction time T of moving picture data is equal to or shorter than the prescribed time A of the fade-in process, the system control portion 103 inhibits the fade-in process and causes the electronic viewfinder 106 via the signal processing portion 104 to display information indicating that the fade-in process has been inhibited (step S210). Then, the system control portion 103 causes the external memory I/F 105 to reproduce moving picture data from the memory card M (step S211).

On the other hand, if the reproduction time T of moving picture data is longer than the prescribed time A of the fade-in process, the system control portion 103 determines whether the reproduction time T is longer than the prescribed time A of the fade-in process plus the predetermined time α (step S203). If so, the system control portion 103 sets the execution time of the fade-in process to the prescribed time A (step S204). On the other hand, if the reproduction time T is equal to or shorter than the prescribed time A of the fade-in process plus the predetermined time α, the system control portion 103 sets the execution time of the fade-in process to the reproduction time T minus the predetermined time α (step S209).

After setting the execution time of the fade-in process (step S204 or step S209), the system control portion 103 causes the external memory I/F 105 to start reproducing moving picture data from the memory card M (step S205). The system control portion 103 also causes the signal processing portion 104 to start the fade-in process and causes an internal counter disposed in the system control portion 103 to start counting time (step S206). Then, (in step S207), it is determined when to end the fade-in process by determining when the counted value provided by the internal counter (started in step S206) has reached a value corresponding to the execution time of the fade-in process (as set in the above-described way in step S204 or step S409). When the internal counter has reached the fade-in process execution time, the system control portion 103 brings the fade-in process to an end (step S208).

Figure 3:
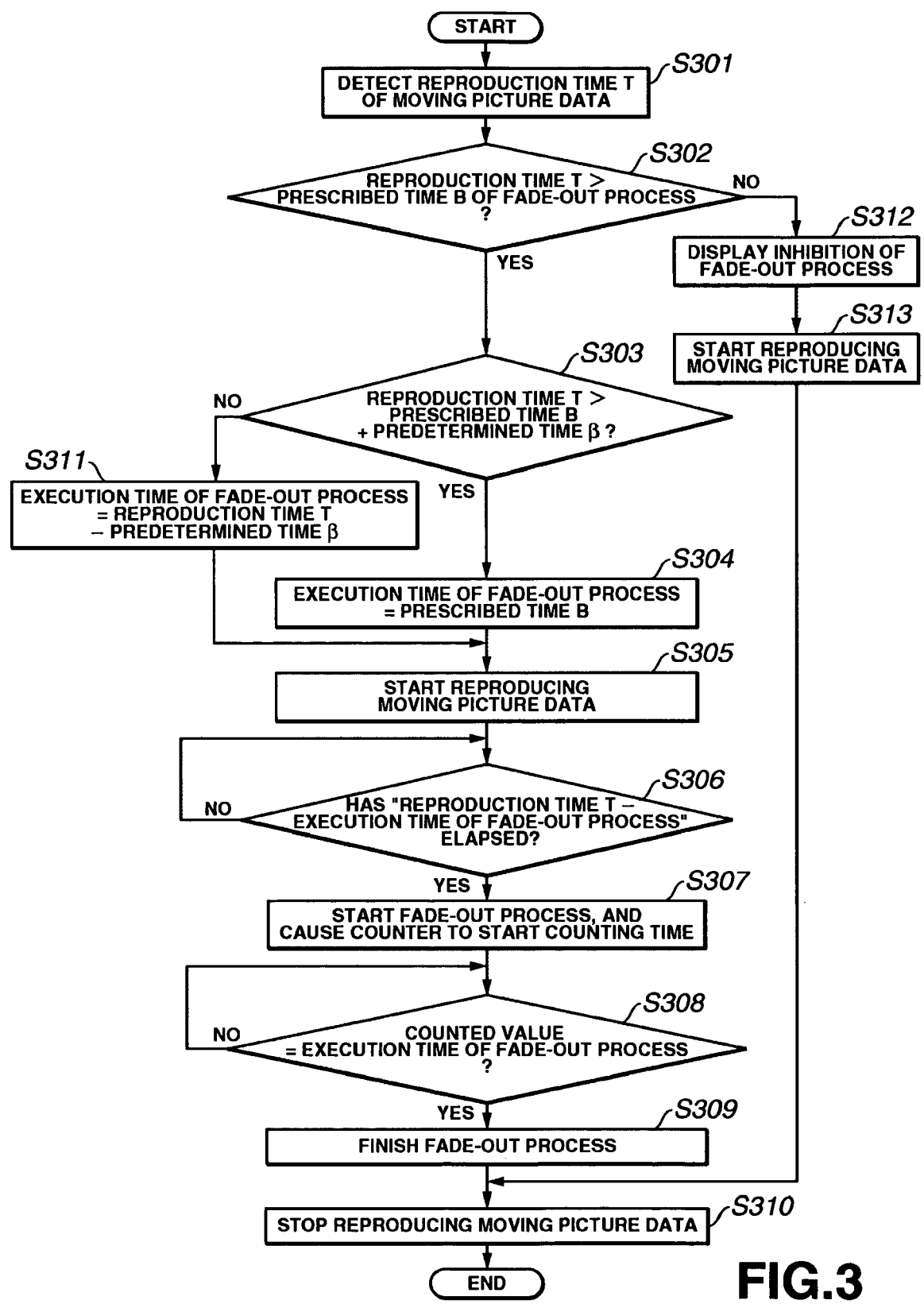
FIG. 3 is a flow chart illustrating a fade-out process performed during reproduction of moving picture data.

FIG. 3 is a flow chart illustrating an exemplary processing flow for a fade-out process performed by the system control portion 103.

When instructions for performing a fade-out process as well as instructions for starting reproduction are given by the operation portion 102, the system control portion 103 detects a reproduction time T of moving picture data by causing the external memory I/F 105 to read out information on the reproduction time T from the memory card M (step S301). Then, the system control portion 103 determines whether the reproduction time T of moving picture data is longer than the prescribed time B of the fade-out process (step S302). If the reproduction time T of moving picture data is equal to or shorter than the prescribed time B of the fade-out process, the system control portion 103 inhibits the fade-out process and causes the electronic viewfinder 106 via the signal processing portion 104 to display information indicating that the fade-out process has been inhibited (step S312). Then, the system control portion 103 causes the external memory I/F 105 to reproduce moving picture data from the memory card M (step S313).

On the other hand, if the reproduction time T of moving picture data is longer than the prescribed time B of the fade-out process, the system control portion 103 determines whether the reproduction time T is longer than the prescribed time B of the fade-out process plus the predetermined time β (step S303). If so, the system control portion 103 sets the execution time of the fade-out process to the prescribed time B (step S304). On the other hand, if the reproduction time T is equal to or shorter than the prescribed time B of the fade-out process plus the predetermined time β, the system control portion 103 sets the execution time of the fade-out process to the reproduction time T minus the predetermined time β (step S311).

After setting the execution time of the fade-out process (step S304 or step S311), the system control portion 103 causes the external memory I/F 105 to start reproducing moving picture data from the memory card M (step S305). When it is determined (in step S306) that the elapsed time from the start of reproduction has reached a time equivalent to the reproduction time T minus the execution time of the fade-out process (set as described above in step S304 or step S311), the system control portion 103 causes the signal processing portion 104 to start the fade-out process and causes the internal counter to start counting time (step S307). Then, when it is determined (in step S308) that the counted value provided by the internal counter has reached a value corresponding to the execution time of the fade-out process, the system control portion 103 brings the fade-out process to an end (step S309). After the fade-out process has ended (step S309) or after the completion of the reproduction of moving data when the fade-out process has been inhibited (step S313), the system control portion 103 causes the external memory I/F 105 to stop reproducing moving picture data (step S310).

As has been described above, such an advantageous effect can be produced that, even if a reproduction time of moving picture data is relatively short, any imperfect fade process can be prevented because an execution time of the fade process is changed depending on the length of the reproduction time.

It should be noted that, while the above embodiment has been described with respect to a fade process to be applied to moving picture data, the present invention may also be implemented with an embodiment in which special effect process(es) other than or in addition to the fade process are applied to moving picture data.

Furthermore, the present invention can also be applied to an apparatus capable of recording and reproducing moving picture data in or from a storage medium other than a memory card, for example, a magneto-optical disk medium.

In addition, it should be noted that the present invention may be implemented as functional components of a reproducing apparatus or an imaging apparatus, or may take the form of hardware, software, firmware or some combination thereof.

Further, the invention has been described in detail with particular reference to a certain embodiment thereof, but it will be understood that variations and modifications can be effected within the scope of the invention as described above, and as noted in the appended claims, by a person of ordinary skill in the art without departing from the scope of the invention.

What is claimed is:

1. A reproducing apparatus comprising:
a reproducing circuit adapted to reproduce one scene of a moving picture recorded in a recording medium;
an effector adapted to apply a special effect process to the moving picture reproduced from the recording medium;
a detector adapted to detect a time length of the one scene of the moving picture to which the special effect process is applied by the effector; and
a controller adapted to determine whether the detected time length of the one scene of the moving picture is longer or shorter than a first time length and to change an execution time length of the special effect process in accordance with a determination result,
wherein the controller sets the special effect process execution time length to a second time length when the controller determines the detected time length of the one scene of the moving picture is longer than the first time length, and the controller changes the special effect process execution time length to a time length shorter than the second time length when the controller determines the detected time length of the one scene of the moving picture is shorter than the first time length.

2. The reproducing apparatus according to claim 1, wherein the reproducing circuit retrieves, from the recording medium, reproduction-time information indicating the time length of the scene of the moving picture, and wherein the detector detects the time length of the scene of the moving picture on the basis of the reproduction-time information retrieved by the reproducing circuit.

3. The reproducing apparatus according to claim 1, wherein the special effect process to be applied by the effector includes a plurality of types of special effect processes.

4. The reproducing apparatus according to claim 3, wherein the second time length for each of the special effect processes is determined based on the respective type of special effect process.

5. The reproducing apparatus according to claim 1, wherein the special effect process includes a fade process.

6. The reproducing apparatus according to claim 1, wherein the effector outputs the scene of the moving picture with the applied special effect process, and further comprising a display circuit adapted to display pictures represented by the scene of the moving picture output by the effector.

7. The reproducing apparatus according to claim 1, further comprising:
an imaging unit; and
a recording unit for recording, in a recording medium, a scene of a moving picture signal provided by the imaging unit.

8. A reproducing apparatus comprising:
a reproducing circuit adapted to reproduce one scene of a moving picture recorded in a recording medium;
an effector adapted to apply a special effect process to the moving picture reproduced from the recording medium, wherein an execution time of the special effect process is a first time length;
a detector adapted to detect detecting means for detecting a time length of the one scene of the moving picture to which the special effect process is applied by the effector; and
a controller adapted to determine whether the detected time length of the one scene of the moving picture is longer or shorter than the first time length, and to control the effector to execute or inhibit application of the special effect process in accordance with the determination result,
wherein the controller controls the effector to execute application of the special effect process when the controller determines the detected time length of the one scene of the moving picture is longer than the first time length, and controls the effector to inhibit application of the special effect process when the controller determines the detected time length of the one scene of the moving picture is shorter than the first time length.

9. The reproducing apparatus according to claim 8, wherein the effector executes the special effect process continuously during the first time length.

10. The reproducing apparatus according to claim 8, further comprising:
an imaging unit; and
a recording unit for recording, in a recording medium, a scene of a moving picture signal provided by the imaging unit.

11. A method for controlling a reproducing apparatus for reproducing a moving picture from a recording medium, comprising:
reproducing one scene of the moving picture from the recording medium;
applying a special effect process to the one scene of the moving picture;
detecting a time length of the one scene of the moving picture to which the special effect process is applied;
determining whether the detected time length of the one scene of the moving picture is longer or shorter than a first time length;
changing an execution time length of the special effect process in accordance with a determination result, wherein the special effect process execution time length is set to a second time length when it is determined that the detected time length of the one scene of the moving picture is longer than the first time length, and the special effect process execution time length is changed to a time shorter than the second time length when it is determined that the detected time length of the one scene of the moving picture is shorter than the first time length; and
outputting the one scene of the moving picture to which the special effect process is applied to display the one scene of the moving picture on a display device.

12. A method for controlling a reproducing apparatus for reproducing a moving picture from a recording medium, comprising:
reproducing one scene of the moving picture from the recording medium;
applying a special effect process to the one scene of the moving picture, wherein an execution time length of the special effect process is a first time length;
detecting a time length of the one scene of the moving picture to which the special effect process is applied;
determining whether the detected time length of the one scene of the moving picture is longer or shorter than a first time length;
controlling the reproducing apparatus to execute application of the special effect process when it is determined that the detected time length of the one scene of the moving picture is longer than the first time length, and controlling the reproducing apparatus to inhibit application of the special effect process when it is determined that the detected time length of the one scene of the moving picture is shorter than the first time length; and
outputting the one scene of the moving picture to which the special effect process is applied to display the one scene of the moving picture on a display device.

* * * * *